United States Patent
Habisreitinger et al.

(10) Patent No.: US 7,128,869 B2
(45) Date of Patent: Oct. 31, 2006

(54) METHOD AND DEVICE FOR PRODUCING SHELL-SHAPED, PLASTIC PARTS REINFORCED WITH FIBRE MATS

(75) Inventors: Uwe Habisreitinger, Lossburg (DE); Bernhard Nordmann, Boeblingen (DE); Michael Ostgathe, Aidlingen (DE)

(73) Assignee: DaimlerChrysler AG, Stuttgart (DE)

( * ) Notice: Subject to any disclaimer, the term of this patent is extended or adjusted under 35 U.S.C. 154(b) by 376 days.

(21) Appl. No.: 10/333,221

(22) PCT Filed: Jul. 7, 2001

(86) PCT No.: PCT/EP01/07869

§ 371 (c)(1),
(2), (4) Date: Jun. 27, 2003

(87) PCT Pub. No.: WO02/07944

PCT Pub. Date: Jan. 31, 2002

(65) Prior Publication Data

US 2004/0021247 A1   Feb. 5, 2004

(30) Foreign Application Priority Data

Jul. 20, 2000 (DE) .............................. 100 35 237

(51) Int. Cl.
*B29C 70/34* (2006.01)
*B29C 70/56* (2006.01)

(52) U.S. Cl. ............... 264/510; 264/102; 264/162; 264/163; 264/511; 264/512; 264/257; 264/258; 264/324; 425/125; 425/126.1; 425/127; 425/289; 425/595

(58) Field of Classification Search ........ 264/510–511, 264/102, 571, 257–258, 162–163, 324; 425/125, 425/126.1, 127, 595, 289
See application file for complete search history.

(56) References Cited

U.S. PATENT DOCUMENTS

| | | | | |
|---|---|---|---|---|
| 4,943,222 A | * | 7/1990 | Nathoo | 425/89 |
| 5,200,133 A | | 4/1993 | Dieul et al. | |
| 5,207,963 A | * | 5/1993 | Grace | 264/163 |
| 5,338,169 A | * | 8/1994 | Buckley | 425/82.1 |

(Continued)

FOREIGN PATENT DOCUMENTS

DE   19829352   1/2000

(Continued)

OTHER PUBLICATIONS

Database WPI, Week 197747, Derwent Publications Ltd., Article No. XP002194676.

(Continued)

*Primary Examiner*—Stefan Staicovici
(74) *Attorney, Agent, or Firm*—Crowell & Moring LLP

(57) ABSTRACT

A process and a production installation for producing shell-shaped, fiber-reinforced plastic parts are provided. The plastic parts can be produced efficiently, in an automated manner which is flexible with respect to the process and workpiece and is operationally reliable. A blank of the endless fiber mat corresponding to a workpiece is placed in an automated manner by industrial robots onto a clamping frame surrounding the female mold and is taken over by the clamping frame in a clamping manner and in such a way that it can slide after itself against a defined resistance. Wide-ranging accessibility required for this is created by a horizontally movable unit, comprising a female mold and a clamping frame, being temporarily moved completely out from the forming press and moved back again into the forming press after completion of loading.

34 Claims, 6 Drawing Sheets

U.S. PATENT DOCUMENTS 5,603,150 A * 2/1997 Assink et al. ............ 29/91.8
5,827,392 A * 10/1998 Buckley et al. .......... 156/275.3
6,001,300 A * 12/1999 Buckley .................... 264/447
6,682,676 B1 * 1/2004 Renault et al. ............ 264/161

FOREIGN PATENT DOCUMENTS

JP          03153321          7/1991

OTHER PUBLICATIONS

D'Rene' Pinzelli, et al., "De'coupe et Usinage des Mate'riaux Composites a Base de Fibres Aramides", Composites, vol. 30, No. 4, 1990.

Rudolf Kleinholz, et al., "Tragerteile fuer Automobilinnenverkleidungen aus naturfaserverstaektem", (PUR-Technik 1996, VDI-Verlag, ISDN 3-18-234193-6) on pp. 17-30.

VDI-Verlag for the Institut für Kunststoffverarbeitung (Institute for plastics processing), Aachen, "RTM/SRIM: Serien-fertigung von Faserverbundbauteilen".

(RTM/SRIM: Series production of fiber composite components) (ISBN 3-18-990015-9).

U.P. Breuer: Beitrag zur Umformtechnik gewebeverstärkter Thermoplaste (contribution to the forming technique of fabric-reinforced thermoplastics), VDI Fortschrittberichte (VDI progress reports), series 2: Fertigungstechnik (production engineering) No. 433, VDI Verlag 1997 (ISBN 3-18-343302-8).

* cited by examiner

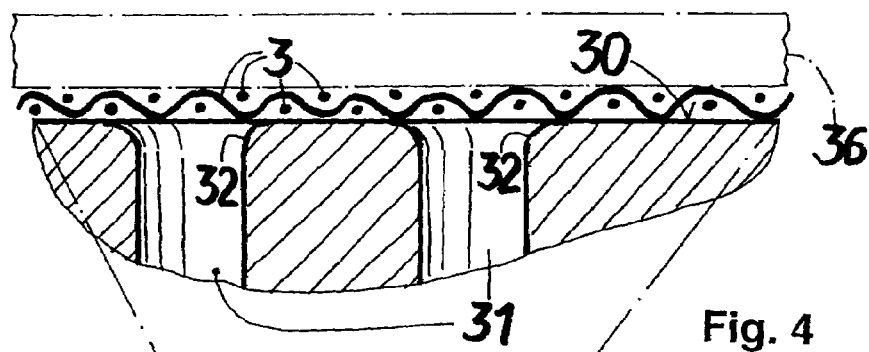
Fig. 4
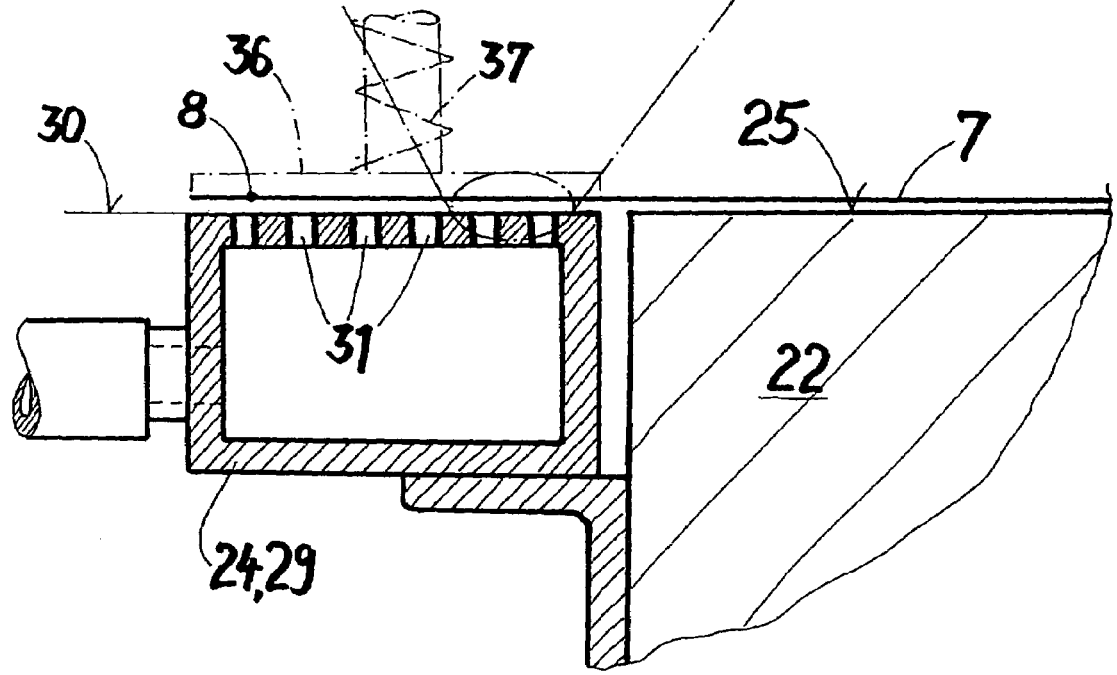
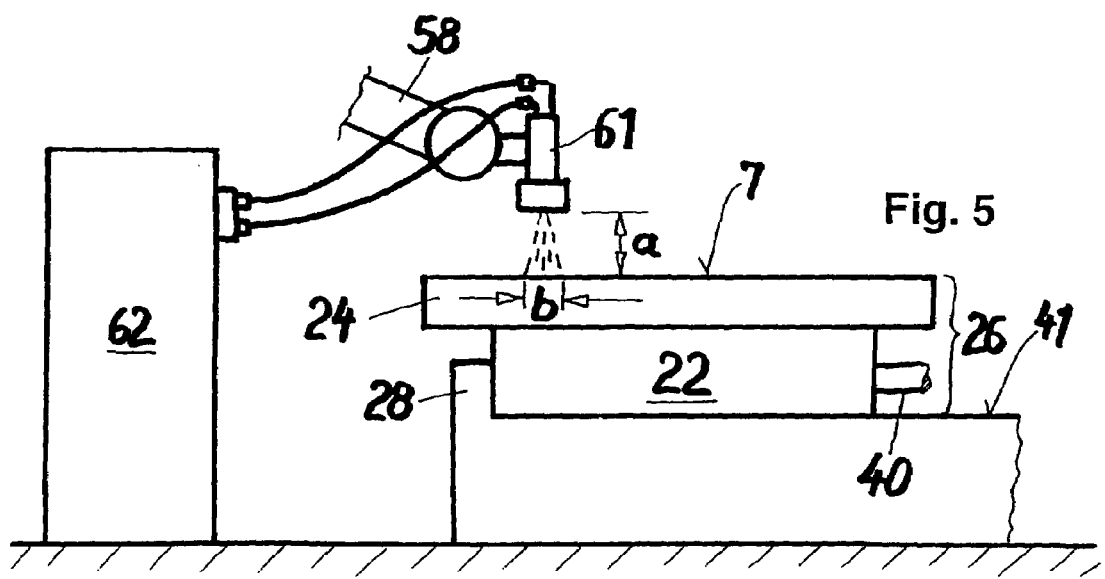
Fig. 5

METHOD AND DEVICE FOR PRODUCING SHELL-SHAPED, PLASTIC PARTS REINFORCED WITH FIBRE MATS

BACKGROUND AND SUMMARY OF THE INVENTION

The invention relates to a process and a production installation for producing shell-shaped, fiber-reinforced plastic parts, in particular from two-component synthetic resin.

In a contribution at the plastics engineering conference "PUR-Technik 1996" in Munich from 31.01.-1.02.1996, Kleinholz et al. discussed a process under the title "Trägerteile für Automobilinnenverkleidungen aus naturverstärktem PUR-Harz" (supporting parts for automobile interior trim of natural-fiber-reinforced polyurethane resin); the corresponding discourse is printed in the conference report issued at the time (PUR-Technik 1996, VDI-Verlag, ISDN 3-18-234193-6) on pages 17–30. The known process is intended to produce unfinished parts for interior door trim of passenger car doors in which natural fiber mats (flax, sisal, jute and so on) are embedded in polyurethane (PU) as the synthetic matrix resin. The fiber mats are formed by a number of nonwoven fabrics formed from broken down natural fibers, in which the individual natural fibers are contained in a random laid layer, are matted by needles to form a uniform fiber composite and are supplied by the mat manufacturer in storage rolls.

During the production of interior door trim, blank parts made to match the dimensions of the trim concerned are cut off from the fiber mat web and initially conditioned to a specific dry content of the natural fibers. The components for the polyurethane resin, mixed in a defined way, are sprayed onto the flat blank in a specifically set amount per unit area by a robot, it being possible for the resin coating to vary locally according to local component stressing. The resin-coated mat blank is manually placed into the female mold of the open forming press, insert parts consisting of rigid plastic on which fastening points of the interior door trim are formed having previously been placed into the female mold, likewise manually.

During pressing, they are bonded with the unfinished part, the polyurethane resin serving as an adhesive. The pressing operation takes place at temperatures above 100° C. and lasts approximately 40 to 70 seconds. After the pressing, the unfinished part can be removed, but still has to be cooled down to room temperature in a separate cooling device in order to avoid distortion. However, only nonwoven fabrics with high elasticity can be formed without any folds to any appreciable extent by this process. The workpiece produced in the cited literature reference—interior door trim for passenger car doors—does not demand high requirements in this respect. Non-elastic fiber mats of ordered long fibers extending continuously and rectilinearly over the entire fiber mat can at most be formed into workpieces with little profiling by this process. If workpieces with greater profiling are to be produced by this process using non-elastic fiber mats, these fiber mats must be previously processed into preforms adapted to the workpiece in a separate process. However, this presupposes that the fibers of the mats are bonded with polymer at the interstices of the mutual crossing points. However, such encapsulation of the fibers in thermoplastic material makes the fiber mats more expensive.

In the book published by the VDI-Verlag for the Institut für Kunststoffverarbeitung (Institute for plastics processing), Aachen, "RTM/SRIM: Serien-fertigung von Faserverbundbauteilen" (RTM/SRIM: Series production of fiber composite components) (ISBN 3-18-990015-9), contribution 2 by A. Bruns "Entwicklung und Produktion von Bauteilen im Harzinjektionsverfahren RTM" (development and production of components by the RTM resin injection process) (pages 28–36) describes inter alia under the heading Anwendungsbeispiele (application examples) an installation for producing outer shells of protective cycle helmets. Reinforcing blanks of a fiber mat of polyethylene fibers are introduced in a dry state into an open female mold of a forming tool. If required, insert parts which reproduce locally finer structures of the later workpiece can be placed in advance into the female mold. By closing the forming tool, the fiber mat blank is draped into the spatial form defined by the form of the tool. In order that the blank can be placed into the form without any folds, it must be provided at suitable points with incisions, or a number of blanks overlapping at the edges, each only partially covering the shell structure, must be used.

After closing the forming tool, a reactive resin mixture of a thermosetting-curable synthetic resin (for example epoxy resin (EP), vinyl ester (VE), unsaturated polyester (UP) and so on) is injected into the fiber structure of the mat, for example by the vacuum injection process, and the placed-in blank parts of the fiber mat are consequently impregnated. The matrix resin can then cure.

To increase annual production, the forming press has three tool sets, so that three helmet shells can be produced virtually simultaneously in one cycle. Moreover, each tool set comprises two lower parts (female mold) and one upper part (male mold), the two female molds of a tool set being able to move from opposite sides of the forming press into the latter, under the male mold. On account of such a configuration of the forming press, during the reaction time of one workpiece, the other female mold can be prepared for a new operating cycle, i.e. cleaned and loaded with new parts. The two female molds of a respective tool set can be alternately brought into the pressing position underneath the male mold, on the one hand, and into a laterally offset preparatory position, lying outside the press, on the other hand. This allows the reaction time of the resin to be used for preparing a new operating cycle. The disadvantage of the known RTM process is that the shell-shaped parts produced with it have an interrupted fiber reinforcement. If it is wished to avoid this, it is necessary—as already explained further above—for separately prefabricated preforms of more expensive fiber mats to be used.

In the same book, mentioned above, contribution 1 (pages 1–27) by Michaeli et al. "Preformherstellung-Umformen" (preform production-forming) is concerned inter alia with the technical aspects of an installation for producing preforms from highly porous mats of synthetic fibers. The mats—in particular loosely beaten woven fabrics or laid scrims of glass fibers or glass fiber rovings—are not only easily bendable but also intrinsically shearable with low resistance. Such a mat adapts itself—in a way similar to a metal sheet in a deep-drawing process—to an amazing extent to spatially defined surface contours if the mat is held under tensile stress from the edge during the forming. To be able to fully utilize the deforming potential of the fiber structures, two-part forming tools comprising a female mold and a male mold are necessary for forming. To be able to stabilize the fiber mats after their forming in the new form, the fibers of such forming mats are doped with a fine powder of a low-melting thermoplastic or a thermally reactive thermosetting material, this material preferably becoming lodged interstitially on the fiber circumference in the region of the crossing points of the fibers.

The binder is thermally activated by heating the mat during the forming and is stabilized by subsequent cooling. The preform produced in this way is stabilized only very weakly in its new shape and must be handled carefully. Its fiber mat is still highly porous and absorbent with respect to a matrix resin. In an example of an installation for the process described in this literature reference, an unwinding station with three storage rolls of fiber mat webs is provided, the individual webs of which run together to form a three-ply web. A shearing cutter beam which extends transversely over the web and can be driven back and forth is used to cut individual blanks to length from the said web in a way corresponding to a desired workpiece. In each case, a blank is heated in a heating station by radiation and/or convection to the softening temperature of the binding polymer, in the heated state is quickly clamped in a clamping frame and both—the clamping frame with the blank—are pushed into the forming press with the female mold and male mold for forming.

The clamping frame for fixing the edge of the mat is adapted to the component geometry and is designed with respect to its edge clamping in such a way that the clamped-in edge of the mat can slide out of the clamping restraint under tension. This is achieved by special friction elements which can be pressed with a defined clamping force, which can be predetermined by pneumatic cylinders, and make it possible for the fiber material to slide after itself during forming. The clamping force must be set such that the fibers do not tear (clamping force too great) and nor do the fiber mats become folded (clamping force too small) during forming. The fiber mat formed into a preform in this way must be kept in the closed tool until the fiber mat has cooled down again and the binding polymer has hardened at the points of intersection. The preform, which now has a certain rigidity of its own, and can be carefully handled manually or, for example, by needle grippers while retaining its form, can subsequently be removed from the lower tool and the clamping frame. Before further processing of the preform, for example in the process described above to form a fiber composite plastic part, the edge of the preform remaining in the clamping frame still has to be trimmed.

In the dissertation by U. P. Breuer: Beitrag zur Umformtechnik gewebeverstärkter Thermoplaste (contribution to the forming technique of fabric-reinforced thermoplastics), VDI Fortschrittberichte (VDI progress reports), series 2: Fertigungstechnik (production engineering) No. 433, VDI Verlag 1997 (ISBN 3-18-343302-8), there is described inter alia a process for producing shell-shaped, fiber-reinforced plastic parts from thermoplastic panels known as 'Organobleche'. This semifinished product comprises sheet-like, virtually endless webs which consist of mats of inorganic fibers—in particular glass or carbon fibers—with a thermoplastic as the matrix resin, and are usually supplied in a coil to the further processor. From this, panels corresponding to the workpiece are cut off to the desired dimensions, heated to the flowing temperature of the thermoplastic matrix polymer and placed into a forming press. To be able to form the heated and softened panels between the female mold and male mold without any folds, it is kept in the stretched state during the forming, the respectively local stress state having to be empirically optimized workpiece-dependently.

Arranged around the female mold is a clamping frame, into which the edge of the softened panel is clamped. The clamping jaws take the form of a multiplicity of narrow rollers, each of which is respectively provided with an adjustable braking device. This makes it possible for the panel to slide after itself out of the edge clamping restraint under an adjustable tensile force during the forming. A disadvantage of this type of edge clamping is that the structural expenditure for this edge clamping is very great and accordingly not only is this quite expensive to produce but frequent disruptions are also likely during operation. What is more, it is not possible for the edge to be firmly held by the braking rollers without a gap. Rather, tension-free strips of varying width between neighboring braking rollers, where folds can form, are constructionally unavoidable.

The process and device shown in DE 198 29 352 A1 for producing shell-shaped moldings from fabric-reinforced plastic are also based on the so-called Organoblech as a preliminary or semifinished product. In the case of the process shown there, the forming operation producing the desired final form in the forming tool is preceded by a preforming step. This is consequently a two-stage forming process with preforming and final shaping. During the preforming, a punch which is brought only very approximately up to the engraving of the forming tool is pressed into the softened plastic panel stretched over the forming tool and the material is consequently made to approximate roughly to the engraving determining the form. Only subsequently is the material completely pressed against the engraving by a vacuum from below and positive pressure from above and the final form produced in this way in the shell material.

The compliant edge clamping of the fabric-reinforced plastic panel provided in the case of this process is also of a two-stage form. To be precise, during the preforming the plastic panel can slide after itself largely without friction out of the edge clamping restraint, whereas during the final shaping a constant tensile stress, counteracting deformation, can be exerted at the edges, allowing deforming largely without any folds. For this purpose, the edge of the panel is clamped between two frames, one of which is fixed in place in relation to the forming tool and the other of which is movable back and forth in relation to the forming tool in the closed state of the press. It is pressed against the lower frame with a force which is predetermined by springs and is small during the preforming and great during the final shaping. With such a pair of frames which can be pressed by spring force, however, only a tensile force that remains the same over the entire periphery of the edge of the panel can be exerted on the plastic panel during the forming. Moreover, this solution cannot be readily transferred to loose fiber mats which, on the one hand, behave anisotropically—unyielding in the direction of the filaments; yielding diagonally to the direction of the filaments—and, on the other hand, are subject to the risk of easily splaying open at the edge.

Problematical in the case of all processes based on loose fiber mats is the handling of the fiber mats. Although the relevant installations described are designed in such a way that the mat blanks, originating from at least one wound-up material web, are conveyed along a linear sequence of working stations following directly one after the other, it remains open how this actually takes place. It is conceivable for the blanks to be carried on flat conveyor belts or on a group comprising a number of conveying straps running parallel to one another. If, on the other hand, it is intended for example after heating for the mat blank to be quickly transferred into a clamping frame, this presents considerable constructional and operational problems. Moreover, closely strung-together production lines are, on the one hand, susceptible to faults on account of the rigid sequence of stations, because a fault in any one station shuts down the entire line. Therefore, the availability of such production lines is generally not optimal. On the other hand, a sequence of working stations that is rigidly connected in technical conveying terms is not very flexible and cannot be readily converted to a different product or a modified process sequence.

In the case of manual handling of the blanks, a production installation can indeed be designed and operated flexibly, but the mats or workpieces then have to be handled by people, which is not only monotonous and physically demanding, but is also expensive on account of the high number of personnel used, in particular in multishift operation.

A further problematical point in the case of the known processes or installations is the state at the edge of the blank parts, which is distorted or frayed to varying extents, it being possible for the fibers to be splayed to varying extents, in particular if—as usual—loosely bonded woven fabrics or laid scrims of superficially smooth fibers, for example glass fibers, are concerned. The edges of the blanks are often already splayed directly after cutting if the cutting means has become blunt. Fabric splaying at the edge is also often unavoidable when large blanks are handled manually. However, distorted or frayed edges of the blank parts can lead on the one hand to operational disruptions and on the other hand even to reject parts.

On the basis of the prior art described, it is the object of the invention to present a process and a production installation for producing shell-shaped, fiber-reinforced plastic parts which can be automated more easily without any appreciable restrictions with regard to the extent of workpiece profiling, but at the same time is nevertheless flexible in the constitution of the process and, moreover, is efficient and operationally reliable.

This object is achieved according to the invention with respect to the process by a forming press with a forming tool having a female mold and a male mold, comprising placing a blank cut off from an endless fiber mat and corresponding to a workpiece in an automated manner by an industrial robot onto the female mold, which has been moved out of the forming press and is firmly held there, in such a way that the blank can be fed after itself, by a surrounding clamping frame; spraying the blank placed in the clamping frame over an entire surface area with a specifically set amount of reactive matrix resin in a region covering the female mold by a spraying nozzle guided movably at a distance from the blank; after moving the female mold-clamping frame unit back into the forming press and closing the forming tool, while maintaining a specifically set tensile stress in the blank, draping the blank into the female mold without any folds or incipient tears, the blank is thereby formed into a desired shell form, at the same time the matrix resin is pressed into spaces between fibers and entrapped air is forced out; keeping the resin-impregnated fiber mat in a formed and pressed state for a specifically set time period and, at the same time, curing the matrix resin within the forming tool; and after opening of the forming tool, removing the plastic part and cutting off an edge of the blank lying outside the desired shell form of the workpiece, serving for stretching out the blank during the forming phase, from the workpiece and with respect to the production installation by a forming press which can be opened and closed, with a forming tool comprising a female mold and a male mold, the female mold arranged at a bottom in the forming press being surrounded on all sides by a clamping frame for the fiber mat blank placed thereon, which clamping frame is held in a spatially immovable position in relation to the female mold, a securing plane of the fiber mat blank being received in the clamping frame coinciding at least approximately with a form parting plane of the female mold; the clamping frame being designed in such a way that an edge of the blank placed on the clamping frame can be firmly clamped therewith in such a way that, when tension acts on the blank, the edge can slide out against an adjustable resistance; the female mold and the clamping frame being mounted and guided in a horizontally movable manner as a unit, which can be moved back and forth between a working position, lying in the forming press under the male mold, and a preparatory position lying completely outside the forming press; alongside the forming press, at least one industrial robot being arranged in such a way that the preparatory position of the female mold-clamping frame unit lies within a working range of the industrial robot; arranged within the working range of the industrial robot, provision containers for ready-to-hand provision of insert parts or of locally delimited preforms of fiber mats; the at least one industrial robot being provided with a hard-part gripper, which is adapted to the insert parts to be placed in, or with a textile-part gripper, which is adapted to the preforms to be placed in; arranged alongside the forming press, an unwinding station for at least one fiber mat web, which station has a holding bar, for holding a free end of the web ready, and a cutting-off device, for cutting through a drawn-off portion of the fiber mat alongside the holding bar, the holding bar likewise lying within the working range of the industrial robot; the at lease one industrial robot being provided with a gripper for drawing off a portion from the stored fiber mat web and for handling a cut-off blank; and the at least one industrial robot being provided with a controllable application nozzle for spraying a reactive matrix resin onto a partial preform placed in the female mold, which is located in the preparatory position, or onto the fiber mat blank placed there, the robot-guided application nozzle being assigned a storing and mixing station for individual components of the matrix resin.

Accordingly, a raft of different measures, which however have the common aim of achieving the underlying object, are proposed. Firstly, the production process is simplified in the sequence of steps, in that the forming of the fiber mats into the desired shell form without any folds, on the one hand, and the curing of the impregnated fiber mat in the forming tool, on the other hand, are combined into a single process step. What is more, fiber mats are only handled in the dry state, which is very conducive to a troublefree process sequence. Moreover, the process steps are constituted in such a way that all the components involved, that is any insert parts, partial preforms possibly to be placed in, the blank parts corresponding to the workpiece and the matrix resin, can be handled in an automated manner by industrial robots. The free space required for this purpose above the female mold, at which the handling operations mentioned take place, is created by the female mold being able to move horizontally and by it being temporarily moved out from the forming press.

The advantages which can be achieved with the invention are as follows: simplified and shortened process, flexible constitution of the process sequence, fold-free run of the fiber mat in spite of high profiling of the shell form of the workpiece, high degree of automation, simplified parts handling, avoidance of handling parts wetted with resin, and as a result, higher installation availability.

Of the expedient embodiments constituting the invention, at this point the one in which a portion of a fiber mat drawn off from a storage roll and corresponding to the workpiece is cut off from the wound-up fiber mat web by a high-speed rotating narrow grinding wheel, which is moved parallel to a plane of rotation and along a line between two closely neighboring holding or gripping bars and placed onto the clamping frame and the female mold (process), and the one in which the cutting-off device for the fiber mat is formed by a high-speed rotating narrow grinding wheel, which is displaceable parallel to a plane of rotation of the grinding wheel and parallel to the holding bar which is firmly holding the free end of the fiber mat web, with an adjustable advancing rate transversely over the fiber mat web (installation) are emphasized in particular, that is the cutting of the blanks corresponding to a workpiece from the stored fiber mat web by a high-speed rotating narrow grinding wheel, in particular by what is known as a cutting wheel, as are used in angle grinders for cutting metal parts or stone slabs. This cutting technique in the present application is not only virtually free from wear, but also leads to an always constantly clean cut, i.e. free from fraying and distortion, when cutting fiber mats, even after the wheel has been used for a considerable time. During the cutting of the fiber mat, the fibers are not so much ground through as rather knocked off locally, owing to inertia, on account of the high impact velocity of the abrasive particles of the narrow grinding wheel against the fixedly held fibers. If, when it is used over a considerable period of time, the abrasive particles on the circumference of the grinding wheel have become rounded and/or flattened owing to wear—this is manifested as a matter of course by the resistance during advancement of the grinding wheel increasing—the circumference of the grinding wheel can be roughened again by a dressing operation with a dressing tool, which comprises for example diamond particles, a diamond nonwoven and/or other bonded hard particles. It is conceivable at most that, after being used for a very long time, many such dressing operations may cause the grinding wheel to become worn away. It is readily possible to compensate for this by correspondingly increasing the rotational speed of the grinding wheel, so that it continues to be possible to cut the fiber mats with an approximately constant circumferential speed.

The surprisingly high service life of the cutting elements of the cutting technique proposed here for fiber mats is plausible under closer consideration. The volume wear of the geometrically undetermined "cutting edges"—in truth they are impact edges—of the proposed cutting wheels is inordinately higher than the volume wear of the conventional cutting elements of a geometrically defined form, whether they are rotating or oscillating cutters, oscillating, locally limitedly cutting shears or shearing cutter beams which cut through the entire web width with one stroke. The many abrasive particles on the overall circumference of the grinding wheel with their undetermined cutting edge geometry are available as effective cutting elements for as long as they are not flattened or rounded. In the case of conventional cutting elements, the volume wear is in any event restricted to a very narrow, direct edge region of the cutting edge of a geometrically defined form. This region is only very small, in particular when considering oscillating cutters or shears, which are slowly moved transversely over the width of the fiber mat web and through the latter. As soon as the edge of a defined form is no longer exactly sharp and free from nicks, the cutting elements begin to hook and tear, which is manifested in the form of a distorted, unclean and frayed cut edge. The cutting element then has to be exchanged for a new one.

Since, in the present case, fibers of inorganic material, such as glass fibers, ceramic fibers or carbon fibers for example, are to be used in particular, the question of wearing of the cutting device and a constantly clean cut is of particular significance. When conventional cutting devices are used, such as advancing-movable, oscillating cutters or shears or shearing cutter beams, the aforementioned fibers that are critical in terms of wear lead to relatively rapid wearing of the cutting elements and to tearing at the cut edges, which leads to an unclean deformed and/or frayed cut edge on the fiber mats. Therefore, not only material costs arise on account of the continual renewal of the cutting elements, but in this connection also indirect and direct maintenance costs on account of personnel training and operational interruptions. It is quite obvious that, even irrespective of the present production process constituted according to the invention or the production installation according to the invention, the cutting technique proposed here can be used equally advantageously anywhere where material webs made of inorganic fibers have to be cleanly cut through.

For the sake of completeness, it should be mentioned in this connection that textiles and fiber mat webs for reinforcing purposes can be cut off on the basis of fundamentally different methods with an undetermined cutting edge, for example ultrasonic cutting, high-pressure water-jet cutting, with or without particles in the water jet, or laser-beam cutting. The disadvantage of this, however, is the high technical outlay for generating the cutting energy. Moreover, cutting off material webs by means of a high-energy water jet or laser beam appears only to be acceptable in cases where it is a matter of cutting along contours of a complicated form, keeping faithfully to the contour, which is not required however in the application concerned in the present case.

Further expedient embodiments constituting the invention and their advantages can be taken from the respective subclaims; otherwise, the invention is further explained below on the basis of an exemplary embodiment represented in the drawings.

BRIEF DESCRIPTION OF THE DRAWINGS

FIG. 4 shows an enlarged representation of the detail IV from FIG. 2 with respect to the clamping-frame suction bar, with a further detail, concerning the working surface of the clamping-frame suction bar, being highlighted in even greater enlargement, FIG. 5 shows the operation of spraying matrix resin onto a fiber mat blank placed onto the female mold/clamping frame unit.

DETAILED DESCRIPTION OF THE DRAWINGS

Figure 1:
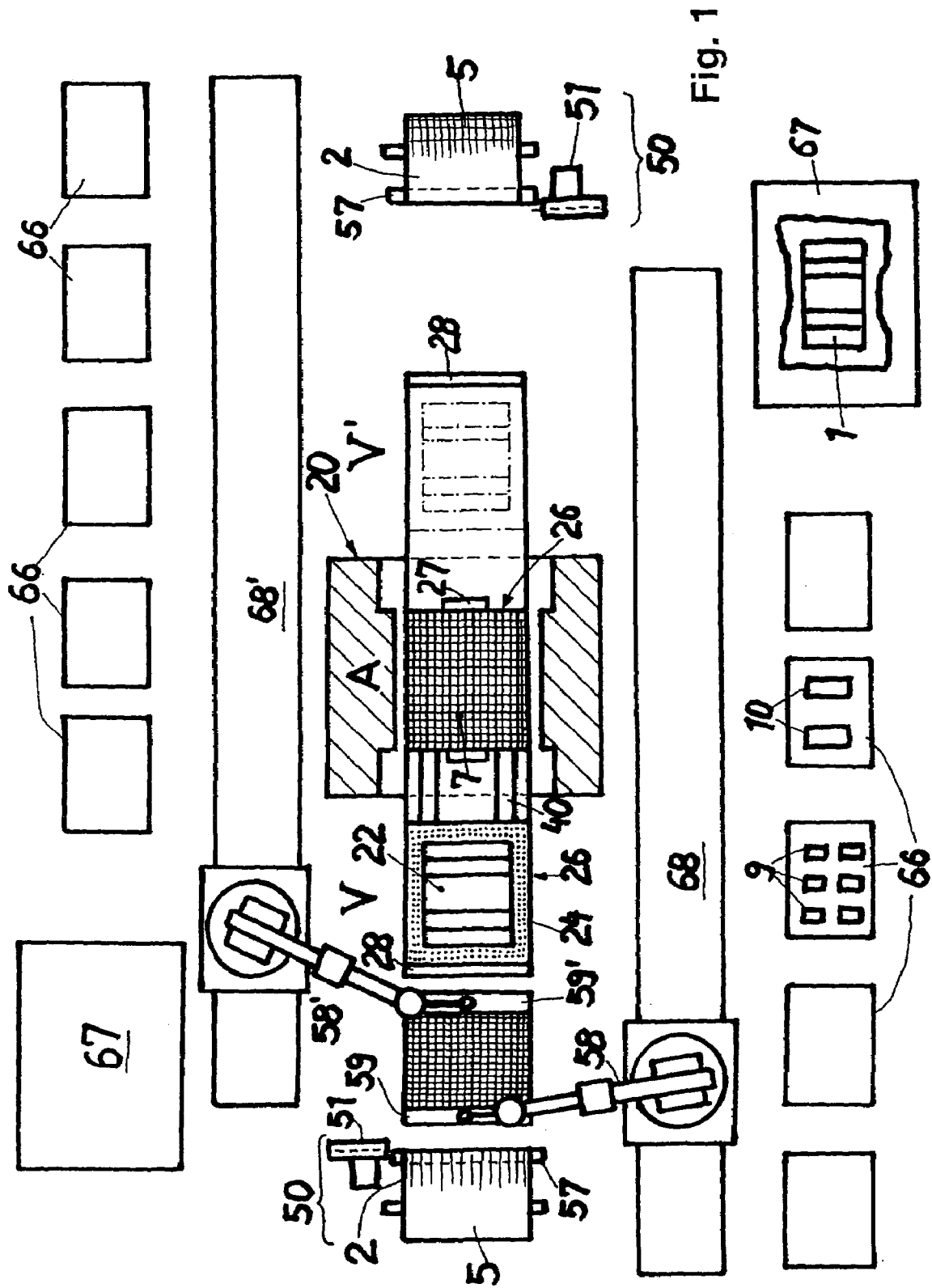
FIG. 1 shows the layout of the production installation in a schematized representation of its outline.

The production installation indicated in the layout according to FIG. 1 serves in implementing the process according to the invention for producing shell-shaped, fiber-reinforced plastic parts. These comprise an at least single-ply endless fiber mat, following the form of the shell, and a thermosetting polymer matrix, embedding the fibers of the fiber mat on all sides and without any pores. In the initial state of the fiber mat, its fibers or fiber bundles 3 run rectilinearly and extend without interruption over the blank 7 corresponding to a workpiece. On account of the way in which they run in an outstretched form in the mat composite, the fibers can absorb considerable tensile forces even after the mat has been formed into the shell-shaped form of the workpiece, but the fiber mat cannot be stretched, apart from a negligible amount owing to the weaving technique. On the other hand, on account of the fact that the fibers are very loosely bonded, the fiber mats are intrinsically shearable without any great resistance, which is exploited for the forming of the fiber mats.

The production installation represented has a forming press 20 which can be opened and closed, with a forming tool 21 comprising a female mold 22 and a male mold 23. The female mold, arranged at the bottom in the forming press, is surrounded on all sides by a clamping frame 24 for a fiber mat blank 7 placed on it. The clamping frame 24 is held in a spatially immovable position in relation to the female mold 22, the securing plane of the clamping frame, determined by the flat side 30, coinciding at least approximately with the form parting plane 25 of the female mold 22. The clamping frame 24 is designed in such a way that the edge 8 of a blank 7 placed on the clamping frame 24 can be firmly clamped with it in such a way that, when tension acts on the blank 7, its edge can slide out of the edge clamping restraint against an adjustable resistance. This is to be discussed in still more detail further below. The female mold 22 and the clamping frame 24 are mounted and guided in a horizontally movable manner on a horizontal guide 41 as a unit 26. This allows the female mold/clamping frame unit to be moved back and forth between a working position A, lying in the forming press 20 under the male mold 23, on the one hand, and a preparatory position V, lying completely outside the forming press 20, on the other hand.

Alongside the forming press 20 there are, in the exemplary embodiment represented, two industrial robots 58 and 58' arranged in such a way that the preparatory position V of the female mold/clamping frame unit lies within the working range of the industrial robots. The industrial robots 58 and 58' are movable on horizontal guides 68 and 68' near the floor and can, as a result, cover the entire base area of the production installation. Likewise arranged within the working range of the industrial robots there are, furthermore, provision containers 66 for the ready-to-hand provision of insert parts 9 of a hard material (rigid plastic, metal) and of locally delimited preforms of fiber mats. The industrial robots 58, 58' represented must be equipped on their operating arms either with double or multiple tools or with quickly exchangeable tools, so that they can perform different tasks. In the present case it is primarily a matter of handling different articles in the course of the process.

Since relatively small hard parts with a complicated surface shape and/or locally delimited reinforcing parts of resin-impregnated fiber mats—known as preforms—are often provided in the plastic parts to be produced, the industrial robots are provided or can be equipped with a hard-part gripper, which is adapted to the insert parts 9 to be placed in, and/or with a textile-part gripper, which is adapted to the preforms 10 to be placed in, which however is not shown in the drawing. Such grippers and changing techniques for robot tools are known per se.

Arranged alongside the forming press 20 there is, furthermore, an unwinding station 50 for a fiber mat web 2, which station has a holding bar 57, for holding the free end of the web ready, and a cutting-off device 51, for cutting through a drawn-off portion of a fiber mat, alongside the holding bar 57. At least the holding bar 57 likewise lies within the working range of the industrial robots 58, 58'. The cutting-off of the fiber mat and the device provided for this purpose are to be discussed in still more detail further below. The industrial robots 58, 58' are—at least in the process phase in which blank parts 7 are to be cut off and handled—respectively provided with bar-shaped grippers 59, 59' for drawing off a portion from the stored fiber mat web 2 and for handling a cut-off blank 7.

What is more, the industrial robots 58, 58' may be equipped with a controllable application nozzle 61 for spraying on a reactive matrix resin. On this basis, they can spray matrix resin in an automated manner onto a partial preform placed in the female mold 22, which is located in the preparatory position V, or onto a fiber mat blank 7 placed on the surrounding clamping frame 24. The individual components of the matrix resin in the correct mixing ratio are fed in separate flexible connecting lines to the robot-guided application nozzle 61 from a storing and metering station 62; the components are intimately mixed in the application nozzle.

The procedure when producing shell-shaped, fiber-reinforced plastic parts is then as follows: the unhindered and wide-ranging accessibility to the female mold 22 and the clamping frame 24 required for the automated charging of the female mold 22 and the clamping frame 24 with blank parts 7 and matrix resin is created by a horizontally movable unit 26, comprising a female mold 22 and a clamping frame 24, being moved completely out of the forming press 20 during this phase of the working cycle. After completion of the loading of the female mold 22 and the clamping frame 24, the unit 26 is moved back again into the forming press 20 and under the male mold 23.

Before placing a blank 7 onto the clamping frame 24, insert parts 9 and/or locally delimited preforms 10, if required, are initially placed in the female mold 22. For the careful handling of the partial preforms 10, the required textile-part grippers may expediently be designed as needle grippers known per se. They have a negative form, adapted to the form of the preform, with integrated clusters of axially movable needles inclined towards one another, which can be inserted into the fiber mats of the preform. All the preforms 10 previously placed into the female mold are sprayed over their entire surface area with a specifically set amount of matrix resin before a following blank 7 is placed onto the clamping frame 24.

After any placement of insert parts (inserts) and/or partial preforms, the fiber mat blank 7 corresponding to the workpiece is placed in an automated manner by the industrial robots 58, 58' onto the clamping frame 24 surrounding the female mold 22 and the edge 8 of the blank is taken over by the clamping frame. The placed and securely held blank 7 is sprayed over its entire surface area with a specifically set amount of reactive matrix resin—restricted to the region covering the female mold 22. For this purpose, the movably guided spraying nozzle 61 is moved back and forth over the blank at the distance a.

By subsequent moving back of the female mold/clamping frame unit 26 into the forming press 20 and closing of the forming tool 21, the blank is draped into the female mold 22 and thereby formed into the desired shell form. In order that this draping of the blank, which is unstretchable but shearable in the plane of extent of the fiber mat, can take place without any folds or incipient tears, a specifically set tensile stress is maintained in the blank 7 by the clamping frame, with it being possible for the edge to slide out of the edge clamping restraint.

During the draping of the blank 7 into the shell form predetermined by the female mold 22, the edge 8 of the blank slides after itself out of the edge clamping restraint on the side of the clamping frame 24 surrounding the female mold 22. For maintaining a specific tensile stress in the blank 7 during this draping phase, the edge 8 of the blank is superficially covered over a specific width and the covering 36, including the edge 8 of the blank, is sucked with a defined force against the air-permeable upper side 30 of the evacuated clamping frame 24. This surface-covering and locally uninterrupted edge clamping can be realized very easily in structural terms and is particularly advantageous for fold-free draping insofar as punctiform or interrupted instances of clamping are avoided, which is also less harmful to the blank itself. In process engineering terms, a particular advantage of vacuum clamping is that it easily allows temporal and sectoral changes of the vacuum clamping to be accomplished. For this purpose, the clamping frame is sectorally subdivided into different chambers 35, so that, during the draping phase, the covering 36 along with the edge 8 of the blank can be sucked sectorally with different force against the clamping frame 24 evacuated sectorally to different degrees.

During the draping phase, the covering along with the edge of the blank can also be sucked against the clamping frame 24 with a force changing over time, in that the vacuum evacuating the clamping frame 24 or the sectors is changed over time. This may take place by means of controllable bypass restrictors, which—starting from a powerful primary vacuum of a constant level—allow locally and/or temporally more or less outside air to penetrate into the evacuated clamping frame bar and accordingly the vacuum effective there to fall more or less sharply. In addition to the vacuum pressing, during the draping phase, the edge 8 of the blank may be mechanically pressed by the covering 36, with a force which can be preset, against the upper side 30 of the clamping frame 24, which covering is, for this purpose, of an intrinsically rigid form and, in the closed state of the tool, is elastically prestressed against the clamping frame by a series of springs 37. By this prestressing of the covering, a certain basic force, remaining constant over time, of the edge clamping that is superimposed on the clamping force on the part of the vacuum clamping can be provided or set. Beyond the extent of the covering 36, the prestressing of the springs 37 can be set to different levels, so that the basic mechanical force of the edge clamping can peripherally differ in its magnitude.

At the same time as the forming of the blank 7, but in particular towards the end of the draping phase and thereafter, the matrix resin is pressed into the spaces between the fibers and entrapped air is forced out from them. Subsequently, the resin-impregnated fiber mat 7 is kept in the formed and pressed state for a specifically set time period and, at the same time, the matrix resin within the forming tool 21 is cured by the effect of heat.

Because of the thermal curing of the matrix resin, the male mold and the female mold are consequently of a heatable form; during production operation, they are adjusted to the curing temperature. Since, in the preparatory or loading phase, the resin-impregnated preforms 10 or blanks 7 do not touch the male mold, the male mold 23 need not be cooled. Cooling of the female mold 22 may, moreover, be confined to the region in which preforms are placed and impregnated with matrix resin. Under some circumstances, it is possible to dispense with prior spraying of preforms which are relatively small and/or have a small number of plies, if instead of this the mat blank 7 is sprayed correspondingly more intensely at the location concerned. Because it is possible to dispense with cooling the male mold 23, and largely also the female mold 22, relatively short curing times can be realized, because cyclical cooling down and heating up of the tool parts is not required, or at least not completely. The finished workpieces can cool down outside the forming tool, the placement of the freshly removed plastic part in a negatively corresponding, cooled forming shell being advantageous in order to avoid distortion.

After the opening of the forming tool 21, the cured plastic part 1 is removed. After the same has cooled down, the edge 8 of the blank lying outside the desired shell form of the workpiece, serving for stretching out the blank 7 during the forming phase, is cut off from the workpiece. This trimming of the shell form of the workpiece, i.e. the cutting-off of the edge 8 of the blank from the workpiece, expediently takes place by a high-speed rotating narrow grinding wheel. However, this work step takes place outside the production installation represented, in a separate working station. The grinding wheel mentioned—for example a commercially available hand-held angle grinder with a fitted cutting wheel for metal or stone—can be guided along the delimiting contour of the shell-shaped workpiece by a programmable industrial robot. To be able in this case to fix the workpiece in a positionally defined manner, secure with respect to tilting, it can be received in a fixed mating shell, negatively corresponding to the workpiece, and be firmly held therein under negative pressure. In a kinematic reversal of this trimming step, it is also possible to fix the shell-shaped workpiece to be trimmed in a positionally defined manner, secure with respect to tilting, in a robot-guided forming tool and to guide the edge of the workpiece along a fixedly secured, high-speed rotating, narrow grinding or cutting wheel.

In the case of multiply fiber mats, the placing and clamping of a blank 7 corresponding to the workpiece on the clamping frame 24 and subsequent spraying of the placed blank 7 with reactive matrix resin is repeated in a way corresponding to the desired number of plies before all the placed and sprayed blanks 7 are together formed and pressed. Although for the case of a multiply reinforcement in the plastic part 1 it would also be readily conceivable to provide a multiply fiber mat web from the outset, as already known from the prior art acknowledged at the beginning, the successive placing and spraying of the blanks has the advantage that the individual blanks can be placed crosswise one on top of the other and in this way it is possible to compensate for a usually existing anisotropy of the fiber mat. Moreover, the individual spraying of the plies ensures a more even distribution of the matrix resin within the laminate. Since, furthermore, the curing time of the matrix resin is determinative for the cycle time and, in the case of an automated tandem operation of the process with two female molds which can be alternately loaded, pressed and cured, within the preparation time there is sufficient time for individual placing and spraying of the plies, the loading may readily also comprise a number of working operations.

An epoxy resin (EP), which lends the finished plastic part a greater strength than, for example, polyurethane (PU), may preferably be used as the matrix resin. To allow the epoxy resin to be processed by spraying, i.e. in an open system, without inadmissibly great air inclusions in the matrix resin, the epoxy resin is set in its viscosity such that it is sprayable and highly fluid and is applied with a mixing and spraying nozzle 61 known from coating technology, in which the individual components of the resin are fed to the mixing nozzle in separate lines from a storing and metering station 62 and are intimately mixed with one another only in the mixing nozzle. A spraying nozzle with a narrow flat form of jet, which—seen over a short time increment—in each case applies only a relatively narrow and short strip to the fiber mat, is selected for carrying out the application. For example, the nozzle 61 is selected and/or set with respect to the form of jet in such a way that, taking into consideration the distance a of the spraying nozzle from the blank 7 to be sprayed, a width b of preferably approximately 10 cm is sprayed with epoxy resin during the movement of the spraying nozzle.

The tandem operation of the process, already briefly mentioned above, can be realized on account of a multiple arrangement, preferably double arrangement, of horizontally movable units 26 comprising a female mold 22 and a clamping frame 24. The various units 26 are loaded outside the forming press 20 and handled within the forming press 20 in an alternating cycle. In the case of the exemplary embodiment represented, two separate units 26, respectively comprising a female mold 22 and a clamping frame 24, are arranged in and on the forming press 20 in a horizontally movable manner on a horizontal guide 41, which units can be alternately displaced back and forth between a working position A and a respective preparatory position V, V', one preparatory position V being arranged on one side of the forming press and the other (V') being arranged on the opposite side. The horizontal guide 41 extends continuously from one side of the press to the other through the forming press. The two units 26, assigned to the opposite sides of the forming press, are rigidly coupled to each other in the case of the exemplary embodiment represented by connections 40 and can be displaced together, like a unitary carriage, on the horizontal guide 41. The associated drive for displacing the units is not represented in the drawing. Independently of the displacing drive, stops 27 and 28 are provided for mechanically securing the connected units in the different end positions—working or preparatory position. In each case, one of the two immovable stops 28 at the opposite ends of the horizontal guide 41 secures the position of the double unit when it respectively moves into the new position. One of the two stops 27, provided within the forming press and movable back and forth, respectively secures the double unit in the opposing direction. In particular, the female mold 22 respectively positioned within the forming press must be positioned particularly accurately in relation to the male mold 23, in order that it can work well together with it.

All the infrastructural devices of the production installation, such as industrial robots 58, 58', unwinding station 50, cutting-off device 51, provision containers 66 and placing stations 67 are duplicated because of the efficient tandem mode of operation of the process, to be precise in the case of the exemplary embodiment represented are arranged symmetrically with respect to the center of the forming press 20. In this case, the logistical devices of the production installation, that is the provision containers 66 and the placing stations 67, are arranged on the periphery of the production installation, in order that they can be reached without having to enter the hazardous area of the industrial robots.

The process, operated in an automated manner, works from a storage roll 5, on which a certain store of a fiber mat web 2 is wound up. It is also conceivable for a number of storage rolls to be kept ready, which however is not represented in the drawing. A multiple arrangement of storage rolls may be advisable even in the case of the process described here, with a view to a rapid change of rolls when one storage roll is empty. A multiple arrangement of storage rolls may, however, also be advantageous for the rapid production of multiply mat blanks, at least whenever the individual plies are isotropic or when they just complement or compensate for one another in their anisotropy.

For creating individual blanks, the free end of the fiber mat web 2, which is held ready in a positionally defined manner by a fixed holding bar 57, which can be controlled in its holding function, is taken up by a robot-guided gripping bar 59' over the entire width of the web, a portion of the fiber mat web 2 corresponding to the workpiece is drawn off from the storage roll 5, the other end of the portion is taken up by a second robot-guided gripping bar 59, likewise over the entire width of the web, the fiber mat web 2 is cut through in the region lying between the fixed holding bar 57 and the second gripping bar 59 and the cut-off blank 7 is placed onto the clamping frame 24.

Figure 6:
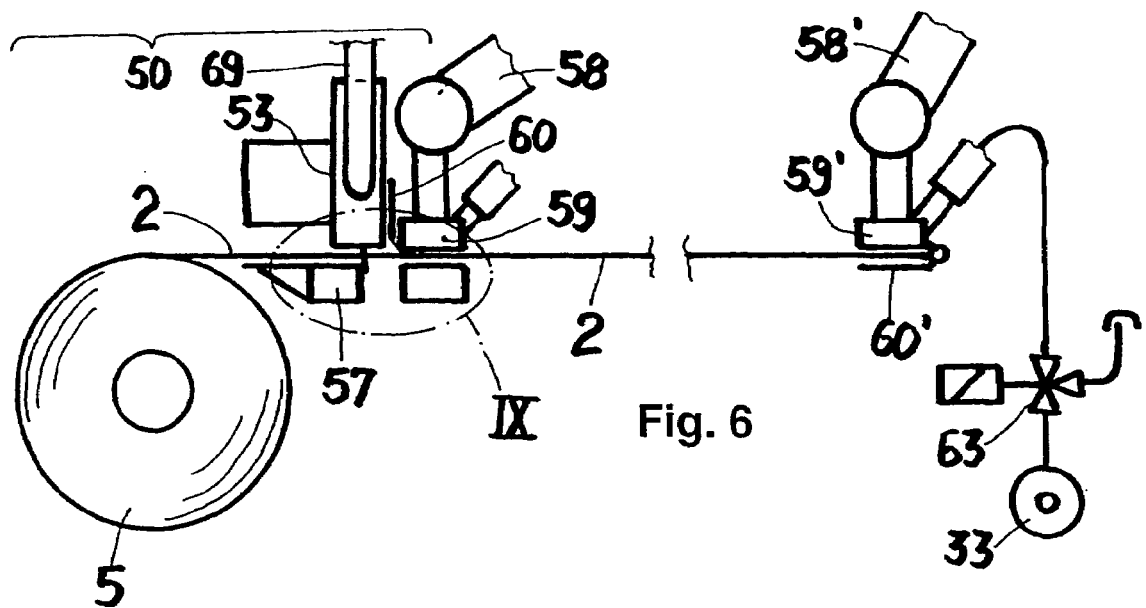
FIG. 6 shows the operation of cutting off a fiber mat blank from the wound-up store and handling of the blank by industrial robots.

In the case of the exemplary embodiment represented in FIGS. 1 and 6, two separate gripping bars 59, 59' are provided for the handling of the blank 7, each of which is arranged on the operating arm of a respective separate industrial robot 58, 58'. During the handling of the blank, the two gripping bars are moved synchronously and equidistantly in relation to each other; the two industrial robots must be correspondingly programmed and synchronized with each other in terms of the program sequence. The advantage of such handling is that all the possible formats of fiber mats can be readily handled, i.e. without providing grippers corresponding to the format. As a result, the handling is very flexible. Alternatively, it is also conceivable for the two gripping bars 59, 59' for the handling of the blank to be part of a unitary gripper frame, which is handled by only one industrial robot. To improve flexibility, the gripper frame may be formed in such a way that it can be changed in size, so that it can be adapted to different blank formats. In any event, the blank 7 corresponding to a workpiece that is cut off from the stored fiber mat web 2 is taken over on two opposite sides by the robot-guided gripping bars and placed onto the clamping frame 24 and the female mold 22.

Figure 9:
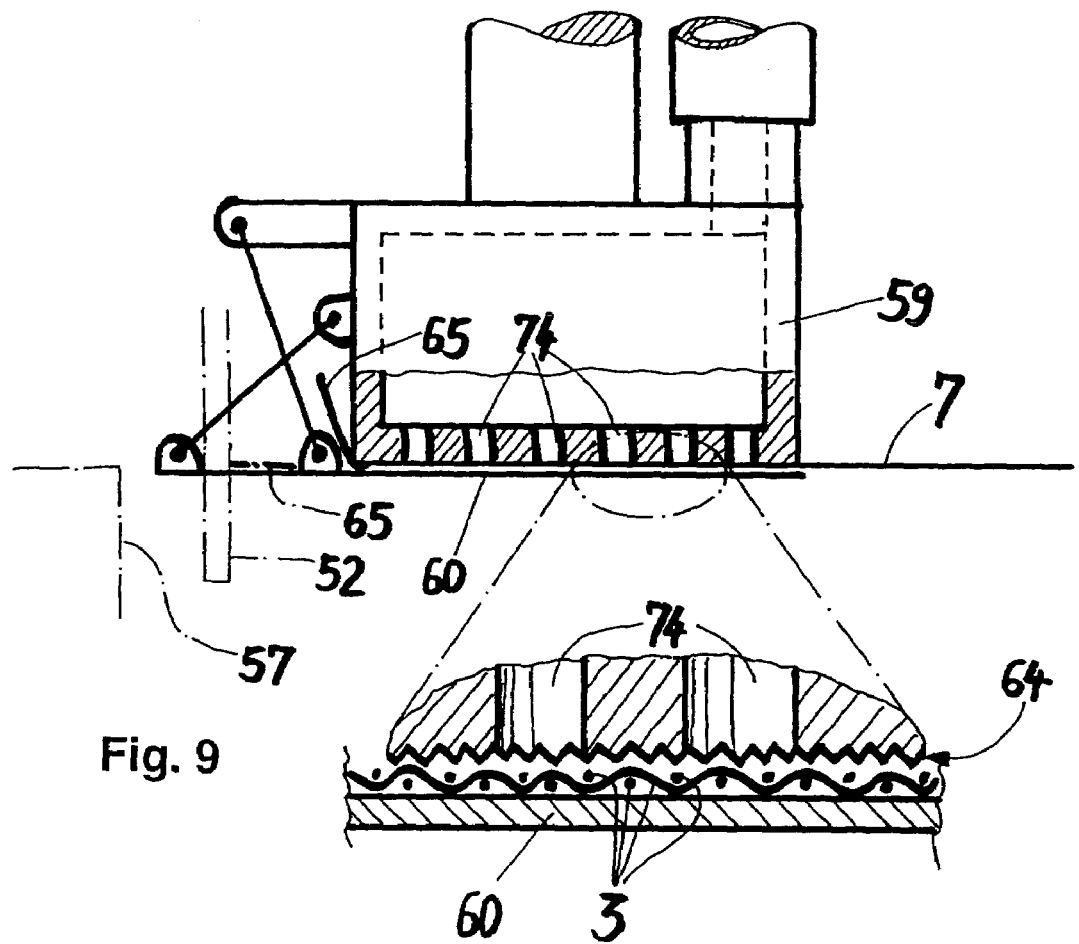
FIG. 9 shows an enlarged representation of the detail IX from FIG. 6, that is one of the two suction bars for handling a fiber mat blank, including the articulation of a movable covering plate.

According to the representation in FIGS. 6 and 9, the gripping bars for handling the blank 7 are formed as a coverable suction bar 59, 59'. They are designed in cross section as a closed hollow profile, which is provided on one flat side with a surface-covering pattern of drilled holes 74. The interior of the hollow profile can optionally be connected to a negative-pressure source 33 or subjected to ambient air pressure by means of a controllable valve 63. The flat side on which the suction is effective can be brought to bear against the edge 8 of the blank 7 and firmly holds it pneumatically by means of negative pressure. To ensure a high holding force of the suction bar, the flat side on which the suction is effective of the handling suction bars may be provided—as shown in the exemplary embodiment—with a roughening 64, that is it may be of a roughened or grooved form.

As can be seen in the exemplary embodiment represented in FIGS. 6 and 9, the suction bars 59 and 59' are provided there, for example, with hinged covering plates 60 and 60'. Initially, i.e. when the suction bars are brought to bear against the edge of the blank to be gripped, these covering plates according to the example are swung back laterally and expose the perforated bearing surface. Instead of a hinged attachment of the covering plates, other forms of articulation or attachment, for example including freely movable covering plates, are also conceivable. In the case of the example, the suction bars must be brought to bear against the edge of the blank in such a way that the hinge axis of the movably articulated covering plate comes to lie approximately flush with the end edge of the blank. After the edge of the blank has been taken up pneumatically by the suction bar and after the edge has been lifted off slightly from the underlying surface, the respective covering plate is swivelled through approximately 270° by a swivel drive (not represented) attached to the suction bar and is swung from outside over the taken-up edge of the blank and covers the latter in an airtight manner. On account of this coverage, the leakage rate of the handling suction bars is significantly reduced; at the same time, the pneumatic force firmly holding the suction bar consequently also increases, because the vacuum in the suction bar increases. The covering plates 60, 60' consequently have the task of reducing the air and energy consumption of pneumatic energy and, along with this, also of increasing the holding force.

The suction bar 59' which can be brought to bear as the first bar against the free end of the fiber mat web 2 held ready by the holding bar 57 can be brought to bear with its one longitudinal edge against the fiber mat directly flush with respect to the cut edge of the mat, i.e. without leaving any overhang. Therefore, in the case of this suction bar, the associated covering plate can be articulated on the one longitudinal edge of the suction bar by a simple hinge, for example by what is known as a piano hinge. The suction bar 59 according to FIG. 9—represented on the left in FIG. 6—which is to be brought to bear as the second bar against the fiber mat portion drawn off from the store firmly holds the fiber mat web, together with the holding bar 57, during the cutting-off operation. Because of the space requirement of the cutting-off device 51, there is always a slight lateral overhang 65 of the fiber mat, which overhangs on the longitudinal side of the suction bar 59. In order that this overhang is not clamped, for example by the covering plate 60 to be swivelled in—which would, on the one hand, impair clean contact of the covering plate on the edge of the blank and, on the other hand, later impair flat placement on the clamping frame 24—, the covering plate 60 is attached by means of a kinematic four-bar linkage to the suction bar 59, which on the one hand allows 270° swivelling of the covering plate, but on the other hand can move around the overhang 65 and push it away upwards.

Figure 2:
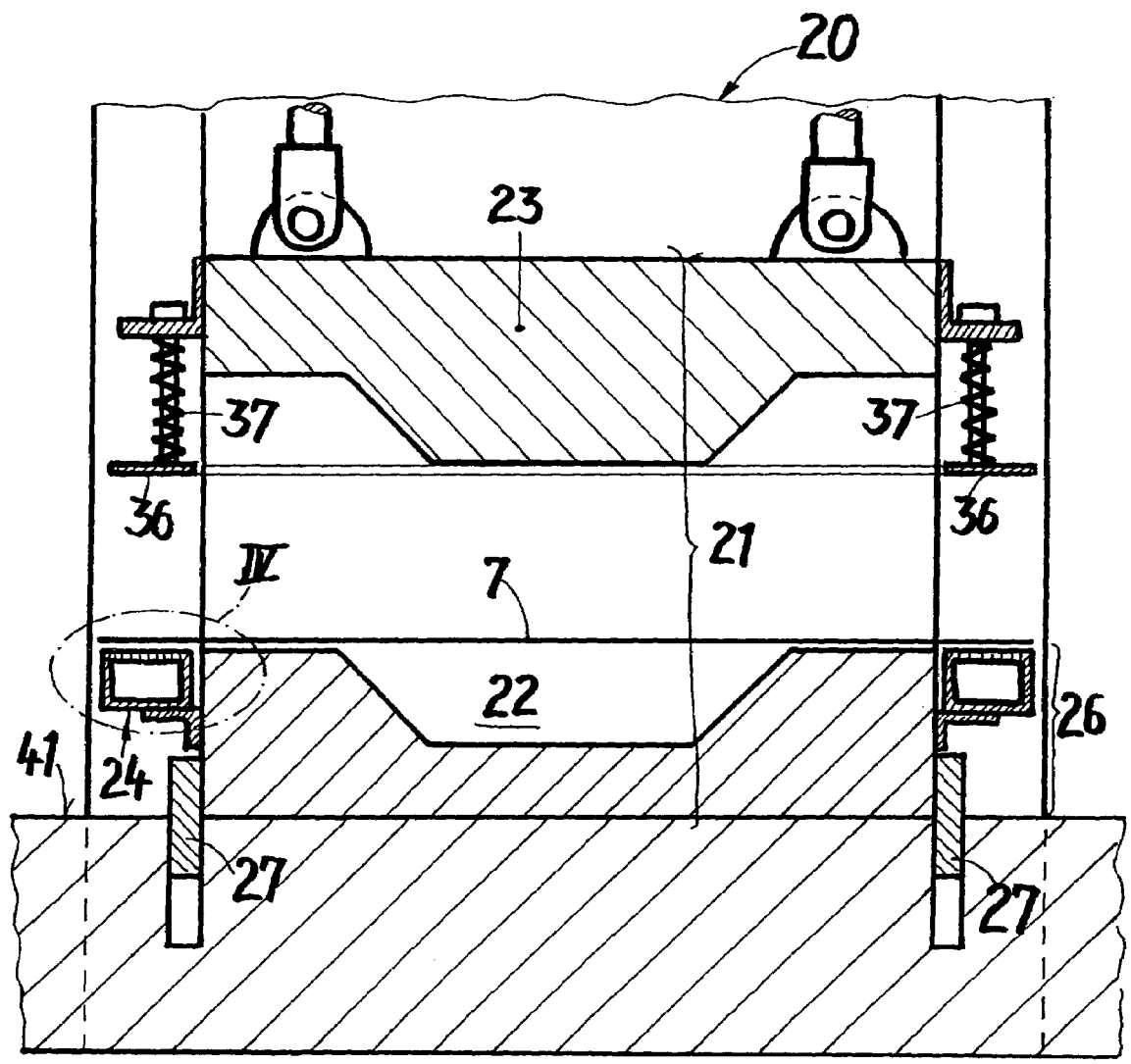
FIG. 2 shows a partial, vertical cross section through the forming press with the forming tool open.
Figure 3:
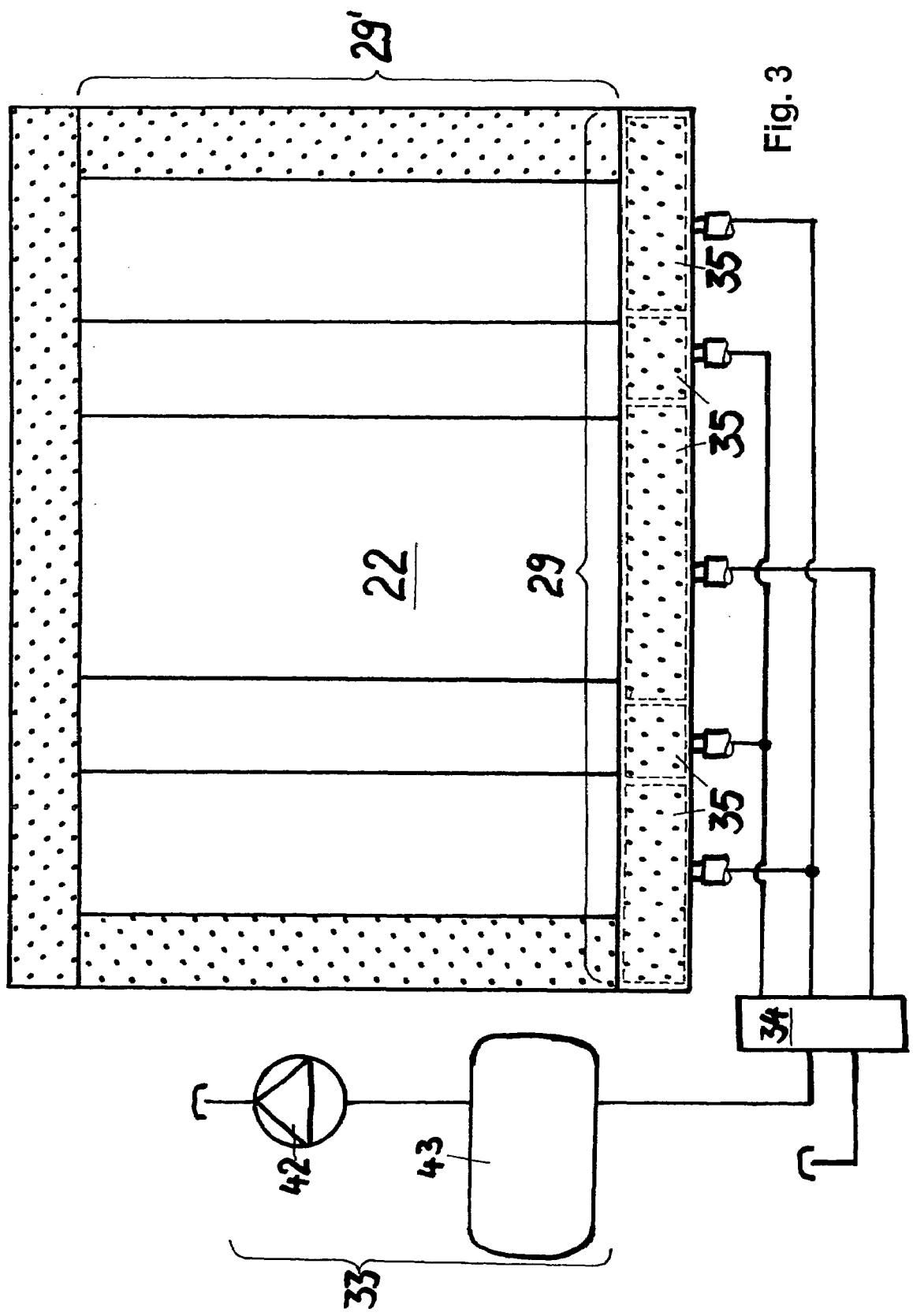
FIG. 3 shows an isolated plan view of the unit comprising the female mold and the clamping frame, including the negative-pressure supply represented in schematized form.

In order that the edge 8 of a blank 7 placed on the clamping frame 24 can be firmly held pneumatically on it, the frame legs of the clamping frame 24 are respectively designed as suction bars 29, 29', which are formed in cross section as a closed hollow profile, as FIGS. 2, 3 and 4 show. The interior of the hollow profile can optionally be connected to a negative-pressure source 33 or subjected to ambient air pressure by means of a controllable valve 34. The negative-pressure source is formed by a vacuum pump 42 and a vacuum tank 43. The flat side 30, taking up the edge 8 of the blank 7, of each suction bar is respectively provided with a surface-covering pattern of drilled holes 31.

During the loading phase, i.e. when the clamping frame 24 is still outside the forming press, the interior of the suction bars is subjected to a vacuum just before the transfer of a blank 7. If a blank 7 is to be placed onto the clamping frame by the robot-guided gripping bars, the vacuum of the gripping bars is switched off—after the covering plates 60, 60' of the gripper-suction bars 59, 59' have been swung aside and the blank stretched out over the clamping frame and pressed onto it—, so that the placed blank is directly taken over by the vacuum of the clamping-frame suction bars 29, 29'. Placing the fiber mat blank on the flat side 30 of the clamping-frame suction bars has the effect that the air resistance of the air which has found its way in there increases sharply, because the air now has to penetrate through the loops and pores of the fiber mat. In a way corresponding to this through-flow resistance, the negative pressure in the suction bars 29, 29', which is initially still moderate, also likewise increases sharply. This negative pressure is adequate to be able to firmly hold the placed blank 7 securely on the clamping frame during the loading phase, during the application of matrix resin and during the pushing of the unit into the working position A.

During the forming phase, i.e. when closing the forming tool and during the draping of the impregnated blank into the female mold, the edge 8 of the blank must be firmly held with significantly higher force on the clamping frame in such a way that it can slide after itself. For this purpose, the exposed surface of the edge of the mat is covered in the forming phase over the entire periphery by a covering plate 36. The air resistance with which ambient air can now find its way into the clamping-frame suction bars now increases very sharply and so too does the vacuum present in the clamping-frame suction bars. As a result, the edge 8 is firmly held pneumatically with higher force on the clamping frame, so that during the draping of the blank a considerable tensile force can be built up in the fiber mat by the male mold. If the level of the tensile force is correctly set and the level of the tensile force is correctly distributed over the periphery of the clamping frame, it is possible to drape the fiber mat in the female mold on the one hand without any folds and on the other hand without any incipient tears. To be able to set the level of the pneumatically effective firmly-holding force at different levels along a clamping-frame suction bar 29, the clamping-frame suction bar concerned according to FIG. 3 is subdivided into various chambers 35, which are divided off from one another and can be activated separately. Given a predetermined capability of the negative-pressure source that is assumed to be constantly high, the level of the vacuum in the individual chambers results from the amount of air which respectively finds its way in, that is the leakage rate, which can be set by adjustable bypass restrictors.

In the case of the exemplary embodiment represented (FIG. 2), the covering 36 for the clamping-frame suction bars 29, 29' is arranged in an elastically compliant manner on the male mold 23, which can be raised and lowered in the forming press 20. With the male mold 23 going down, the covering 36 is also lowered onto the edge 8 of the blank 7 received in the clamping frame 24, the covering being pressed elastically against the edge 8 by the springs 37. The covering is disposed in front of the engraving of the male mold, so that it is first to come to bear against the edge 8 of the blank as the male mold goes down. The covering plate 36 is, on the one hand, soft and compliant in the back-and-forth direction, so that it bears against the edge 8 of the blank over the entire periphery without any bulges. A close arrangement of pressing springs 37 undoubtedly also contributes to this. On the other hand, the covering plate is stable enough in the horizontal direction for it not to yield when the edge slides after itself out of the edge clamping restraint. The stability of the covering in the horizontal direction is likewise enhanced by a close sequence of guiding bolts, one of which in each case is arranged in the interior of a pressing spring 37.

Usually, the forces which can be pneumatically applied between the perforated flat side 30 and the covering 36 are adequate to be able to clamp the edge 8 of the blank in such a way that it can slide after itself with the force which is required locally. To permit troublefree sliding of the clamped-in edge after itself, in the case of the exemplary embodiment represented (FIG. 4) the surface of the flat side 30 of the clamping-frame suction bars is of a smooth form; moreover, the drilled holes 31 of the surface-covering pattern of drilled holes goes over into the flat side in a rounded manner (rounding 32). This allows the fiber mat to slide out in a controlled manner between the surfaces clamping it in. At most in special cases, where a particularly high firmly-holding force is required at locally very restricted points and/or sliding of the mat after itself is to be avoided, it may be advisable to provide locally limited areas of the surfaces on the flat side and/or on the covering with a roughening, following the example of FIG. 9 for the handling suction bars.

Figure 7:
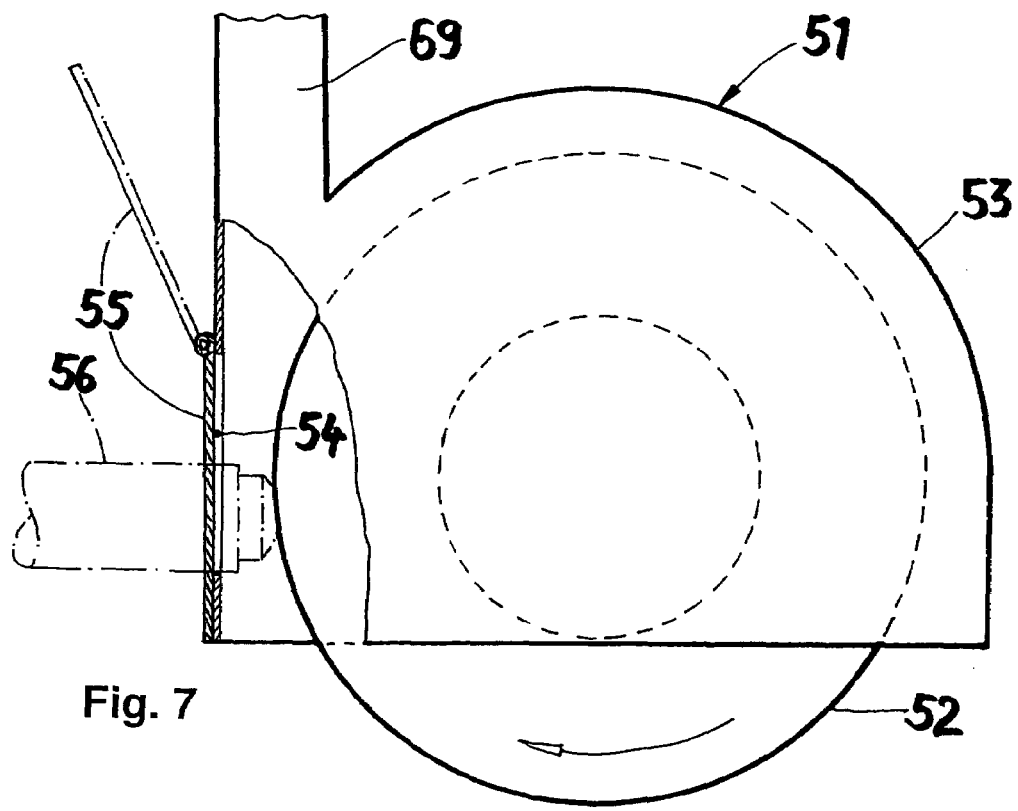
FIG. 7 shows an enlarged representation of a detail of the cutting-off device.
Figure 8:
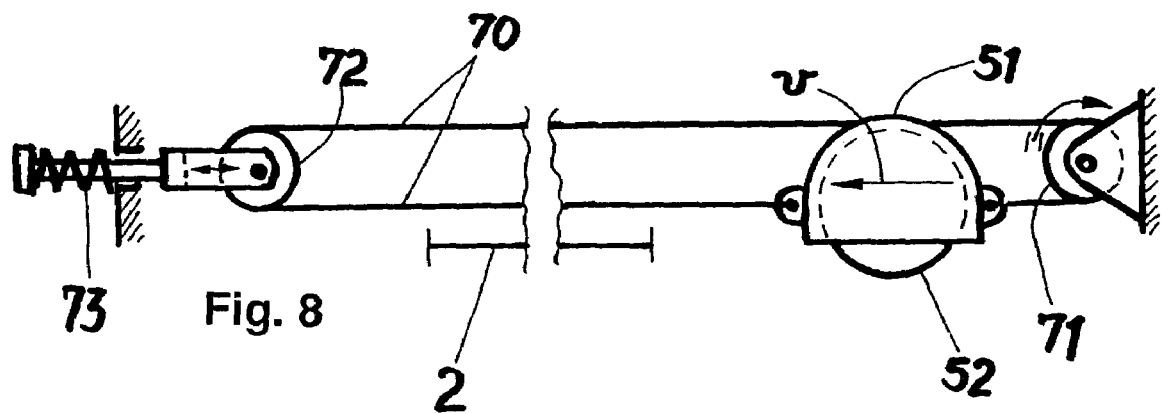
FIG. 8 shows a schematic representation of the advancement of the cutting-off device.

The process which is used here, but which can be used generally, and the device for cleanly cutting through mat webs made of inorganic fibers is now to be discussed in still more detail on the basis of FIGS. 6, 7 and 8.

The fiber mat blank 7 corresponding to a workpiece which is drawn off from the storage roll 5 is cut off from the fiber mat web 2 by a high-speed rotating narrow grinding wheel 52. This is a cutting wheel which is customary for cutting metal or stone. It is moved parallel to the plane of rotation and along the holding bar 57 which is firmly holding the fiber mat web 2, on the one hand, and along the adjacently acting gripping bars 57, on the other hand, with a specifically set advancing rate v through the fiber mat 2. This cutting technique is very efficient, simple, inexpensive and low in wear. An always constantly clean cut, free from distortion and fraying, is produced, even after the wheel has been used for a considerable time.

A narrow strip of the fixedly held fiber mat, lying at the point of the grinding wheel 52, is shattered into fine fiber fragments by the grinding wheel rotating at high circumferential speed (3000–5000 rpm). In order not to allow this dust of sharp-edged particles to get into the workplace environment, the grinding wheel 52 is encapsulated on the side emerging from the fiber mat web 2 and the encapsulation 53 is connected to a dust extraction via a suction connection 69.

After the cutting device has been in use for a considerable time, it may happen that the abrasive particles lying on the outer circumference of the grinding wheel 52 become rounded or flattened owing to wear.

This is manifested by an increased resistance when advancing the cutting-off device. To be able to monitor the state of wear of the grinding wheel, the device for advancing the cutting-off device 51 through the fiber mat web 2 is provided with a device for measuring the advancing force and also with a signalling device, which emits an outwardly perceptible signal when the advancing force exceeds a threshold value which can be preset. This is realized in the case of the exemplary embodiment schematically represented in FIG. 8 by the fact that the cutting-off device 51 sliding on a rod guiding mechanism (not represented) and on rollers is driven in the direction of advancement v by means of a continuous loop 70 of a cable line or a chain and, after the separating cut, is fetched back again by rapidly traversing in the opposite direction. The loop 70 extending transversely over the fiber mat web 2 to be cut is led at one end over a rotationally driven drive roller 71 and at the other end over a tensioning roller 72. The horizontally movably mounted tensioning roller 72, kept under the force of a tension spring 73, keeps the loop under a determined prestress. If the resistance of the fiber mat web to the grinding wheel 52, pushing forward to the left in FIG. 8, increases inadmissibly, the tensioning roller 72 yields in the opposite direction, that is to the right, and tensions the spring 73 to a greater extent. This yielding movement of the tensioning roller can be sensed by a microswitch. An acoustic and/or optical warning signal for the maintenance personnel can be triggered by a circuit which can be closed by the said microswitch. It is then time to dress the grinding wheel 52 for a short time.

To be able to dress the grinding wheel 52 unproblematically and rapidly, the encapsulation 53 of the grinding wheel has an opening 54 for introducing a dressing tool 56. The opening is normally closed by a flap 55 or a slide, in order not to impair the dust extraction.

By means of a dressing tool 56 pressed radially against the circumference of the rotating grinding wheel, new, angular grinding particles can again be exposed on the circumference of the grinding wheel.

Application of the invention described allows the following advantages to be achieved overall:

For the fold-free draping of the textile blanks, horizontally effective tensile forces are specifically introduced into the textile. During the forming, the textile is guided between a perforated bar and an air-impermeable bar. A negative pressure is built up via the perforation. With very simple means, the holding-back force can be exactly metered by subdividing the perforated bar into various regions and varying the negative pressure in these chambers. What is more, the edge of the blank is firmly held peripherally over a certain width without interruption and in surface-area contact, i.e. not for instance at individual points or along short line segments. Firmly holding the edge of the blank in surface-area contact and without interruption does, however, enhance draping of the blank into the form without any folds, in particular if the firmly-holding force can be changed sectorally and rapidly over time and can be optimally adapted to the momentary requirements.

On account of the use of two female molds (saving a male mold in comparison with two complete tools) and the application of the matrix resin to the blank or, if appropriate, to the partial preform, the cycle time is significantly reduced in comparison with conventional processes (for example injection processes).

The use of an open system even when processing epoxy resin makes tandem operation possible, which is efficient and reduces cycle time.

The process according to the invention avoids the handling of resin-coated textiles and consequently considerably avoids the risk of operational disruptions caused by soiling. In the case of other processes, operational disruptions keep occurring, for example on account of the soiling of devices, for example needle grippers with movable needles. Consequently, the availability of the installation is improved by the invention.

The construction of the installation requires a minimal surface area. The arrangement of the starting materials in a ring around the installation makes it possible for the magazines to be loaded while production is in progress.

On account of the cutting-to-size of the reinforcing textiles at a time and place directly before processing, additional handling and transport are saved. As a result, the risk of fraying and of undesired distortion of the textiles is minimized.

The cutting-to-size of the textiles takes place with a geometrically undetermined cutting edge. Both glass fibers and carbon fibers can be cut to size with high cut-edge quality and long service lives of the cutting means.

The handling, transport and positioning of the reinforcing textiles take place by means of pneumatic gripping systems with an effective vacuum. Along with the simple construction, the advantage of these suction bars is to be seen in particular in a homogeneous introduction of force into the blank and a resultant virtually distortion-free placement of the textile.

The invention claimed is:

1. Process for producing shell-shaped plastic parts from fiber-reinforced, thermosetting plastic in a forming press with a forming tool having a female mold, a female mold-clamping unit, and a male mold, comprising:
    moving the female mold out of the forming press,
    placing a blank cut off from an endless fiber mat and corresponding to a workpiece in an automated manner by an industrial robot onto the female mold, which has been moved out of the forming press, and is firmly held there, in such a way that the blank is fed after itself, by a surrounding clamping frame,
    spraying the blank placed in the clamping frame over an entire surface area with a specifically set amount of reactive matrix resin in the region covering the female mold by a spraying nozzle guided movably at a distance from the blank,
    after moving the female mold-clamping frame unit back into the forming press and closing the forming tool, while maintaining a specifically set tensile stress in the blank, draping the blank into the female mold without any folds or incipient tears, the blank is thereby formed into a desired shell form, at the same time the matrix resin is pressed into spaces between fibers and entrapped air is forced out,
    keeping the resin-impregnated fiber mat in a formed and pressed state for a specifically set time period and, at the same time, curing the matrix resin within the forming tool, and
    after opening of the forming tool, removing the plastic part and cutting off an edge of the blank lying outside the desired shell form of the workpiece, serving for stretching out the blank during the forming phase, from the workpiece.

2. Process according to claim 1, wherein, on account of a multiple arrangement of horizontally movable units each comprising a female mold and a clamping frame, the horizontally movable units is loaded outside the forming press and handled within the forming press in an alternating cycle.

3. Process according to claim 1, wherein a free end of a fiber mat web wound up on a storage roll, which said end is held ready in a positionally defined manner by a fixed holding bar, which is controlled in a holding function, is taken up by a robot-guided gripping bar over the entire width of the web, a portion of the fiber mat web corresponding to the workpiece is drawn off from the storage roll, the other end of the portion is taken up by a second robot-guided gripping bar, likewise over the entire width of the web, the fiber mat web is cut through in a region lying between the fixed holding bar and the second gripping bar and the cut-off portion is placed onto the clamping frame.

4. Process according to claim 1, wherein a portion of a fiber mat drawn off from a storage roll and corresponding to the workpiece is cut off from the wound-up fiber mat web by a high-speed rotating narrow grinding wheel, which is moved parallel to a plane of rotation and along a line between two closely neighboring holding or gripping bars, firmly holding the fiber mat web, with a specifically set advancing rate through the fiber mat.

5. Process according to claim 1, wherein the blank cut off from a stored fiber mat web and corresponding to the workpiece is taken over on two opposite sides by robot-guided gripping bars and placed onto the clamping frame and the female mold.

6. Process according to claim 1, wherein, before placement of the blank of a number of blanks onto the clamping frame, firstly insert parts or locally delimited preforms are placed into the female mold.

7. Process according to claim 6, wherein all the preforms to be placed in advance before placement of the blank onto the clamping frame are sprayed over an entire surface area with a specifically set amount of matrix resin.

8. Process according to claim 1, wherein the placing and firm holding of said blank corresponding to the workpiece on the clamping frame and subsequent spraying of the placed blank with reactive matrix resin is repeated in a way corresponding to a desired number of plies and the forming and pressing of the placed and sprayed blanks is only carried out subsequently for all of them together.

9. Process according to claim 1, wherein epoxy resin, which is set in viscosity to be sprayable and highly fluid, is used as the matrix resin, the spraying nozzle being selected or set with respect to a form of jet in such a way that, taking into consideration the distance of the spraying nozzle from the fiber mat blank to be sprayed, a width of from 5 to 15 cm, is sprayed with epoxy resin during movement of the spraying nozzle.

10. Process according to claim 1, wherein, for maintaining a specific tensile stress in the blank during the draping into the shell form predetermined by the female mold and during the sliding of the edge of the blank after itself out of the edge clamping restraint on the side of the clamping frame surrounding the female mold, the edge of the blank is superficially covered over a specific width and a covering, including the edge of the blank, is sucked with a defined force against an air-permeable upper side of the evacuated clamping frame.

11. Process according to claim 10, wherein, during the draping, the covering along with the edge of the blank can be sucked sectorally with different force against the clamping frame, which is sectorally subdivided into different chambers and is correspondingly evacuated to different degrees.

12. Process according to claim 10, wherein, during the draping, the covering along with the edge of the blank is sucked against the clamping frame with a force changing over time, in that a vacuum evacuating the clamping frame or sectors of the same is changed over time.

13. Process according to claim 10, wherein, in addition to the vacuum pressing, during the draping, the edge of the blank is mechanically pressed by the covering, with a force which can be preset, against the upper side of the clamping frame, which said covering is of an intrinsically rigid form and elastically prestressed.

14. Process according to claim 1, wherein the trimming of the shell form of the workpiece, serving for stretching out the blank during the forming, from the workpiece, takes place by a high-speed rotating narrow grinding wheel.

15. Production installation for producing shell-shaped, fiber-reinforced plastic parts, which said plastic parts comprise an at least single-ply endless fiber mat, following a form of a shell, and a thermosetting polymer matrix or matrix resin, embedding fibers of the fiber mat on all sides and without any pores, which said endless fiber mat in an initial state is formed by the fibers or fiber bundles extending rectilinearly and without interruption over a blank corresponding to a workpiece, comprising:

a forming press which can be opened and closed, with a forming tool comprising a female mold and a male mold, the female mold, arranged at a bottom in the forming press, being surrounded on all sides by a clamping frame for the fiber mat blank placed thereon, which said clamping frame is held in a spatially immovable position in relation to the female mold, a securing plane of the fiber mat blank being received in the clamping frame coinciding at least approximately with a form parting plane of the female mold, the clamping frame being designed in such a way that an edge of the blank placed on the clamping frame can be firmly clamped therewith in such a way that, when tension acts on the blank, the edge can slide out against an adjustable resistance, the female mold and the clamping frame being mounted and guided in a horizontally movable manner as a unit, which is moved back and forth between a working position, lying in the forming press under the male mold, and a preparatory position, lying completely outside the forming press, alongside the forming press, at least one industrial robot being arranged in such a way that the preparatory position of the female mold-clamping frame unit lies within a working range of the industrial robot, arranged within the working range of the at least one industrial robot, provision containers for ready-to-hand provision of insert parts or of locally delimited preforms of fiber mats, the at least one industrial robot being provided with a hard-part gripper, which is adapted to the insert parts to be placed in, or with a textile-part gripper, which is adapted to the preforms to be placed in, arranged alongside the forming press, an unwinding station for at least one fiber mat web, which said station has a holding bar, for holding a free end of the web ready, and a cutting-off device, for cutting through a drawn-off portion of the fiber mat alongside the holding bar, the holding bar likewise lying within the working range of the industrial robot, the at least one industrial robot being provided with a gripper for drawing off a portion from the stored fiber mat web and for handling a cut-off blank, the at least one industrial robot being provided with a controllable application nozzle for spraying a reactive matrix resin onto a partial preform placed in the female mold, which is located in the preparatory position, or onto the fiber mat blank placed there, the robot-guided application nozzle being assigned a storing and mixing station for individual components of the matrix resin.

16. Production installation according to claim 15, wherein a number of separate units, respectively comprising a female mold and a clamping frame, are arranged in and on the forming press in a horizontally movable manner, which said units can be alternately displaced back and forth between the working position and preparatory positions.

17. Production installation according to claim 15, wherein two separate female mold-clamping frame units are arranged on opposite sides of the forming press.

18. Production installation according to claim 17, wherein the two separate units, arranged on opposite sides of the forming press, are rigidly coupled to each other and are guided displaceably together in a rectilinear horizontal manner.

19. Production installation according to claim 15, wherein the cutting-off device for the fiber mat web is formed by a high-speed rotating narrow grinding wheel, which is displaceable parallel to a plane of rotation of the grinding wheel and parallel to the holding bar which is firmly holding the free end of the fiber mat web, with an adjustable advancing rate transversely over the fiber mat web.

20. Production installation according to claim 19, wherein the grinding wheel is encapsulated on a side emerging from the fiber mat web and the encapsulation is connected to a dust extraction.

21. Production installation according to claim 20, wherein an opening which can be closed by a flap or a slide and is intended for introducing a dressing tool for the grinding wheel is provided on an outer periphery of the encapsulation.

22. Production installation according to claim 19, wherein a device for advancing the cutting-off device through the fiber mat web is provided with a device for measuring an advancing force and also with a signalling device, which is designed in such a way that exceeding of the advancing force over a threshold value which can be preset can be signalled outwardly.

23. Production installation according to claim 19, wherein the grinding wheel is provided with a dressing tool which is mechanically guided in an axial direction with respect thereto, can be fed in radially and is provided with an axial servo-motor advancing drive and with a radial servo-motor infeed drive, with said tool the grinding wheel can, in response to a dressing command, be automatically dressed in accordance with a program which can be input in advance.

24. Production installation according to claim 15, wherein frame legs of the clamping frame which firmly hold the edge of a blank placed on the clamping frame are respectively designed as suction bars which can be covered and are formed in cross section as a closed hollow profile, with a flat side taking up the edge of the blank and provided with a surface-covering pattern of drilled holes, the interior of the hollow profile optionally being connected to a negative-pressure source or subjected to ambient air pressure by way of a controllable valve.

25. Production installation according to claim 24, wherein at least one of the clamping-frame suction bars is subdivided into chambers, which are divided off from one another and can be activated separately.

26. Production installation according to claim 24, wherein a surface of the flat side of the clamping-frame suction bars which takes up the edge of the blank is of an at least partially smooth form and goes over into the drilled holes of the surface-covering pattern of drilled holes in a rounded manner.

27. Production installation according to claim 15, wherein the covering of frame legs of the clamping frame formed as suction bars is arranged on the male mold, which can be raised and lowered in the forming press, and, with the male mold going down, can be lowered onto the edge of the blank received in the clamping frame and can be pressed elastically against the edge.

28. Production installation according to claim 15, wherein gripping bars for handling the blank are designed as suction bars which can be covered and are formed in cross section as a closed hollow profile, with a flat side which can be brought to bear against the edge of the blank and is provided with a surface-covering pattern of drilled holes, the interior of the hollow profile optionally being connected to a negative-pressure source or subjected to ambient air pressure by way of a controllable valve.

29. Production installation according to claim 28, wherein a surface of the flat side of the suction bars which can be brought to bear against the edge of the blank for handling the blank is roughened or grooved.

30. Production installation according to claim 15, wherein two separate gripping bars are provided for handling of the blank, each of which is arranged on an operating arm of a respective separate industrial robot.

31. Production installation according to claim 15, wherein the textile-part gripper for handling the partial preforms is designed as a needle gripper.

32. Production installation according to claim 15, wherein all infrastructural devices of the production installation, or the industrial robot, unwinding station, cutting-off device, provision containers and placing stations are duplicated and are arranged symmetrically with respect to a center of the forming press.

33. Production installation according to claim 15, wherein logistical devices of the production installation, or the unwinding station, the provision containers and the placing stations, are arranged on a periphery of the production installation.

34. A method of making a contoured plastic part from fiber-reinforced, thermosetting plastic in a forming press with a forming tool having a female mold and a male mold, comprising:

moving the female mold out of the forming press, forming a blank by cutting off a portion of a fiber mat, placing the blank corresponding to a workpiece in an automated manner by an industrial robot onto the female mold, firmly holding the blank on the female mold by a clamping frame surrounding the blank in such a way that the blank can be fed after itself, spraying the blank over a surface area with a specifically set amount of reactive matrix resin in a region covering the female mold by a spraying nozzle guided movably at a distance from the blank, moving the female mold and clamping frame as a unit into the forming press, closing the forming tool, while maintaining a specifically set tensile stress in the blank, draping the blank into the female mold without any folds, forming the blank into a desired contoured form and pressing the matrix resin into spaces between fibers, keeping the resin-impregnated blank in a formed and pressed state for a specifically set time period and curing the matrix resin within the forming tool, opening the forming tool, removing the plastic part, and cutting off an edge of the blank lying outside the desired contoured form of the workpiece, said edge serving for stretching out the blank during forming, from the workpiece.

\* \* \* \* \*